(12) United States Patent
Joo

(10) Patent No.: US 9,301,246 B2
(45) Date of Patent: Mar. 29, 2016

(54) SENSOR NETWORK AND METHOD OF LINK EXTENSION BASED ON TIME SLOT RELAYING IN THE SAME

(71) Applicant: Electronics and Telecommunications Research Institute, Daejeon (KR)

(72) Inventor: Seong-Soon Joo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 229 days.

(21) Appl. No.: 13/742,641

(22) Filed: Jan. 16, 2013

(65) Prior Publication Data

US 2013/0182637 A1    Jul. 18, 2013

(30) Foreign Application Priority Data

Jan. 16, 2012  (KR) .................. 10-2012-0004681
Jan. 3, 2013   (KR) .................. 10-2013-0000751

(51) Int. Cl.
   *H04W 52/02*   (2009.01)
   *H04W 72/04*   (2009.01)
   *H04W 88/04*   (2009.01)

(52) U.S. Cl.
   CPC .......... *H04W 52/02* (2013.01); *H04W 52/0209* (2013.01); *H04W 52/0219* (2013.01); *H04W 72/0446* (2013.01); *H04W 88/04* (2013.01)

(58) Field of Classification Search
   None
   See application file for complete search history.

(56) References Cited

U.S. PATENT DOCUMENTS

2006/0007907 A1    1/2006  Shao et al.
2007/0280157 A1*  12/2007  Kwon et al. ................... 370/329
2008/0253327 A1*  10/2008  Kohvakka et al. ............ 370/330
2010/0265871 A1*  10/2010  Ko et al. ........................ 370/315
2011/0051656 A1*   3/2011  Hethuin et al. ................ 370/315
2011/0243011 A1*  10/2011  Togashi et al. ................ 370/252

FOREIGN PATENT DOCUMENTS

FR         2929781 A1  * 10/2009
KR     1020100135499 A     12/2010

OTHER PUBLICATIONS

Pil-Seong Jeong, et al., A Cross Layer Protocol based on IEEE 802.15.4 for Improving Energy Efficiency, Nov. 2007 vol. 36 No. 7.
Seong-Soon Joo, et al., Proposed Resolution for LB#85 CID 284-287, IEEE P802.15 Working Group for Wireless Personal Area Networks (WPANs), Nov. 1, 2012.
Seong-Soon Joo, et al., Time-slot Relaying based Link Extension (TRLE) draft for TG4k, IEEE 802.15 Working Group for Wireless Personal Area Networks (WPANs), Jul. 27, 2012.
Seong-Soon Joo, et al., Time-slot Relaying based Link Extension for Wide Area Monitoring Networks, USN/IoT Research Dept., ETRI, Korea.

* cited by examiner

*Primary Examiner* — Michael Thier
*Assistant Examiner* — Yaotang Wang
(74) *Attorney, Agent, or Firm* — William Park & Associates Ltd.

(57) ABSTRACT

A sensor network includes: a network coordinator that broadcasts a first beacon frame; a sensor device that receives a frame from the network coordinator or transmits a frame to the network coordinator; and at least one repeater that relays the frame of the network coordinator to the sensor device or relays the frame of the sensor device to the network coordinator and that broadcasts a second beacon frame that is synchronized with the first beacon frame, wherein the sensor device is synchronized with the second beacon frame to transmit/receive the frame, the cyclic-superframe includes a plurality of slotted-superframes corresponding to the first beacon frame and the second beacon frame, and the network coordinator, the sensor device, and the repeater operate in a periodically repeated cyclic-superframe structure.

19 Claims, 7 Drawing Sheets

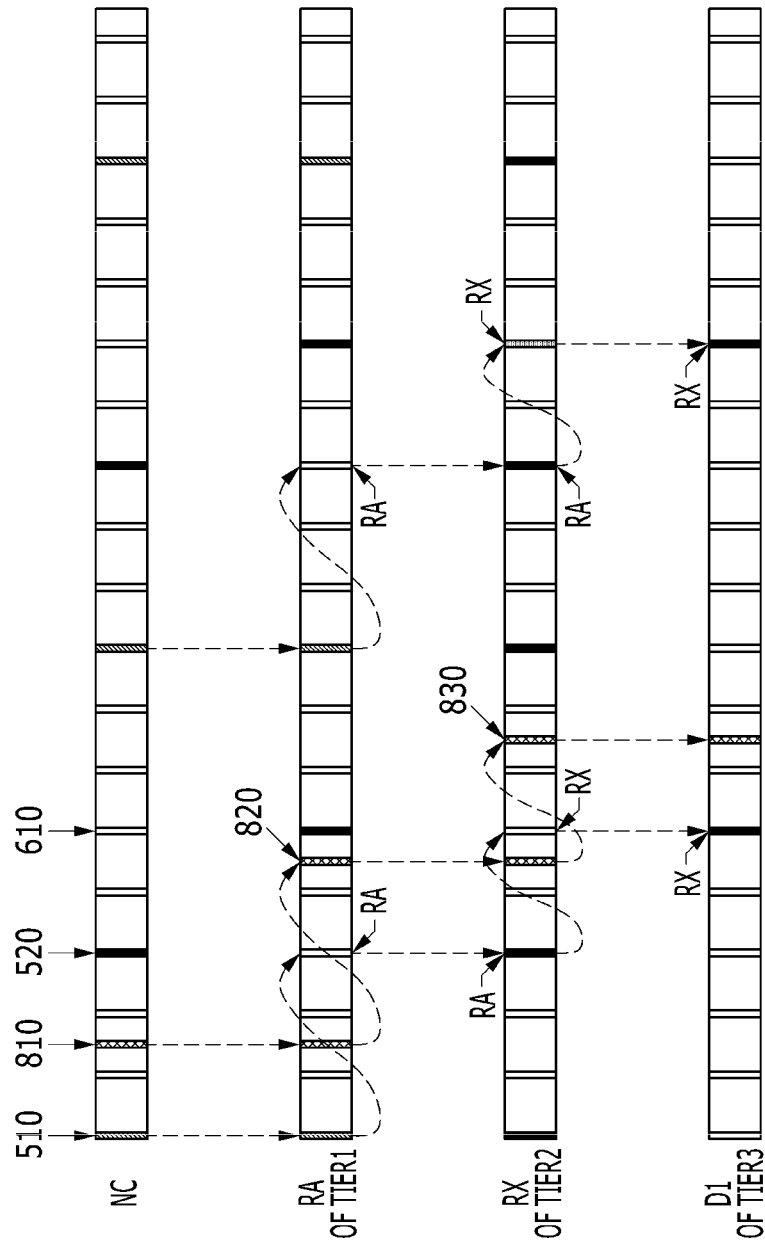

SENSOR NETWORK AND METHOD OF LINK EXTENSION BASED ON TIME SLOT RELAYING IN THE SAME

CROSS-REFERENCE TO RELATED APPLICATION

This application claims priority to and the benefit of Korean Patent Application Nos. 10-2012-0004681 and 10-2013-0000751 filed in the Korean Intellectual Property Office on Jan. 16, 2012 and Jan. 3, 2013, the entire contents of which are incorporated herein by reference.

BACKGROUND OF THE INVENTION (a) Field of the Invention

The present invention relates to a sensor network and a method of link extension based on time-slot relaying in the sensor network.

(b) Description of the Related Art

A low energy critical infrastructure monitoring network (hereinafter referred to as an 'LECIM network') is a network that connects a sensor device that is positioned at the ground, in the ground, underwater, and within a building that are distributed to a wide area, and because the sensor device is positioned at a location at which it is difficult to perform maintenance after installation, the sensor device should operate for several years with an independent power source like a battery and be able to periodically transmit data under a wireless environment having much change.

FIG. 1 is a diagram illustrating a wireless connection between a network coordinator and a sensor device (a near node, a far node, a hidden node, a competition node, and an out of bounds node) constituting an LECIM network. Here, the out of bounds node can receive a frame from the network coordinator, but represents a sensor device that cannot transmit a frame thereof to the network coordinator due to the limit of a transmission range.

In one area LECIM network that is formed with one network coordinator, it is expected that 1000 or more sensor devices exist, generation data of the device is several tens to several hundred bytes, and data is generated within 1 day to within several tens of seconds. Because the network coordinator always uses a power source, the network coordinator has no limitation in a wireless transmission distance and frame transmission, but the sensor device has a limitation in a wireless transmission distance and the number of data frame transmissions. The sensor device minimizes power consumption, should be able to reliably transfer data periodically or at a random moment, and should be able to receive a network configuration control related message from the network coordinator.

Because a coordinator of the LECIM network always uses a power source, the coordinator can increase a transmission distance, but the sensor device has a limitation in use of power and thus cannot increase a transmission distance, so coverage of the LECIM network having a star-topology is determined according to a transmission distance of the sensor device. In network extension by peer-to-peer (P2P) topology, in order for the sensor device to constitute or maintain a network, exchange of a control message is necessary, and when continuously transmitting/receiving a networking protocol for a long term with a limited power source of the sensor device, there is a problem that frequent replacement of a battery or an operation life-span of a monitoring device is shortened.

Because the network is positioned at a difficult location to perform maintenance, in order to operate for several years or more with an independent power source and to stably operate a monitoring network under a wireless environment having much change after installation, a method of configuring a network that can operate the sensor device with low power and increase an arrival distance of a low power wide area monitoring network is necessary.

SUMMARY OF THE INVENTION

The present invention has been made in an effort to provide a method of networking a low energy critical infrastructure having advantages of enlarging an application area of a sensor network having star-topology while minimizing power consumption.

An exemplary embodiment of the present invention provides a sensor network. The sensor network includes: a network coordinator that broadcasts a first beacon frame; a sensor device that receives a frame from the network coordinator or transmits a frame to the network coordinator; and at least one repeater that relays the frame of the network coordinator to the sensor device or relays the frame of the sensor device to the network coordinator and that broadcasts a second beacon frame that is synchronized with the first beacon frame, wherein the sensor device is synchronized with the second beacon frame to transmit/receive the frame, the network coordinator, the sensor device, and the repeater operate in a periodically repeated cyclic-superframe structure, and the cyclic-superframe includes a plurality of slotted-superframes corresponding to the first beacon frame and the second beacon frame.

Another embodiment of the present invention provides a method of link extension based on time-slot relaying in a sensor network. The sensor network includes a network coordinator, a sensor device, and a repeater belonging to each layer that is formed according to a distance from the network coordinator, and the method includes: relaying, by a repeater, having received a frame at a first time slot among time slots within a cyclic-superframe of a network coordinator or a repeater from the network coordinator or the repeater of a layer that is higher than that thereof, the frame to a layer that is lower than that thereof at a time slot corresponding to the first time slot of time slots within a cyclic-superframe thereof; and relaying, by a repeater, having received a frame at a second time slot of time slots within a cyclic-superframe thereof from a sensor device or a repeater of a layer that is lower than that thereof, the frame to a next layer that is higher than that thereof at a time slot corresponding to the second time slot of time slots within a cyclic-superframe of a network coordinator or a repeater of a layer that is higher than that thereof.

According to the present invention, in order to form a low power wireless network in a wide area, by using a beacon-based time slot link structure, an access method on a slot link basis, and a frame relay method by a repeater, while maintaining star-topology, power consumption of a device is minimized, and a transmittable area of the network can be extended.

BRIEF DESCRIPTION OF THE DRAWINGS

FIG. 6A is a diagram illustrating a process of transmitting a frame from a network coordinator to a sensor device by frame relay in an LECIM network.

DETAILED DESCRIPTION OF THE EMBODIMENTS

Figure 1:
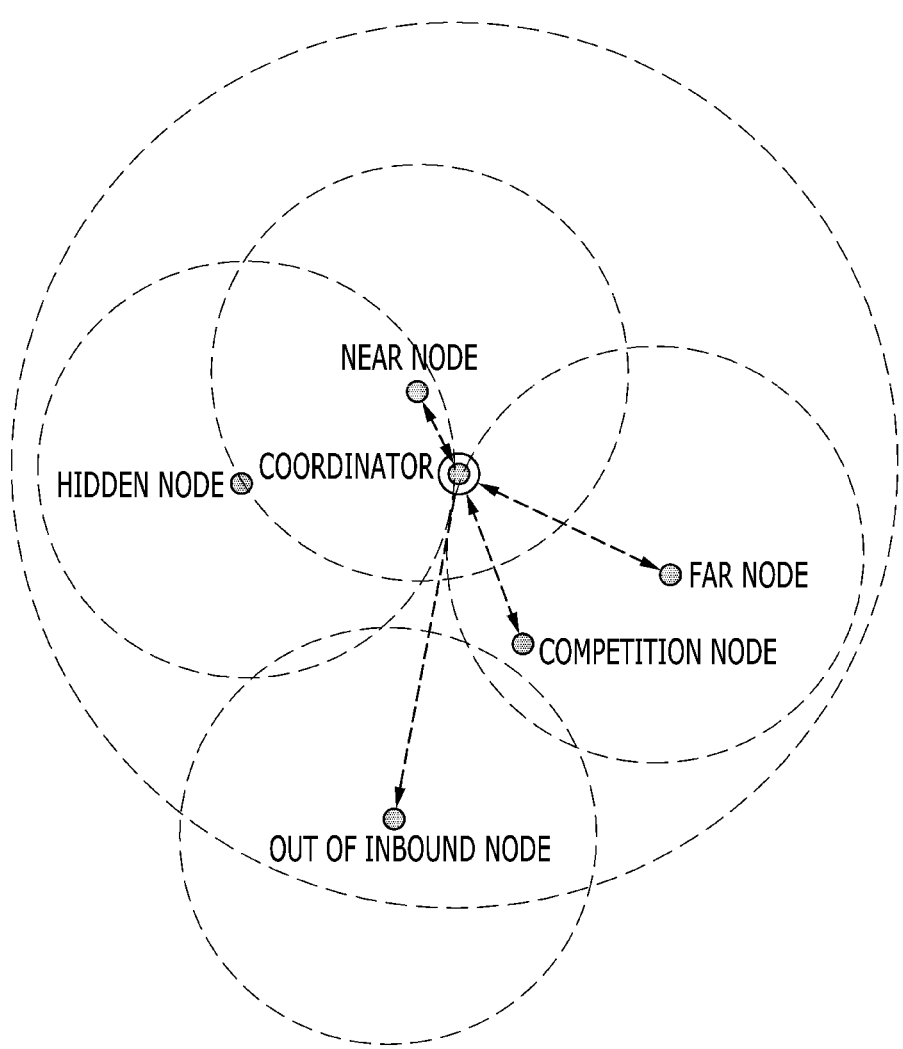
FIG. 1 is a diagram illustrating a wireless connection between a network coordinator and a sensor device constituting an LECIM network.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

The present invention relates to a MAC layer link configuration of a sensor network (e.g., an LECIM network), and more particularly, to a structure of a time slot of a slotted-superframe, a slot link access method, and a method of extending a time-slot relaying based link.

Figure 2:
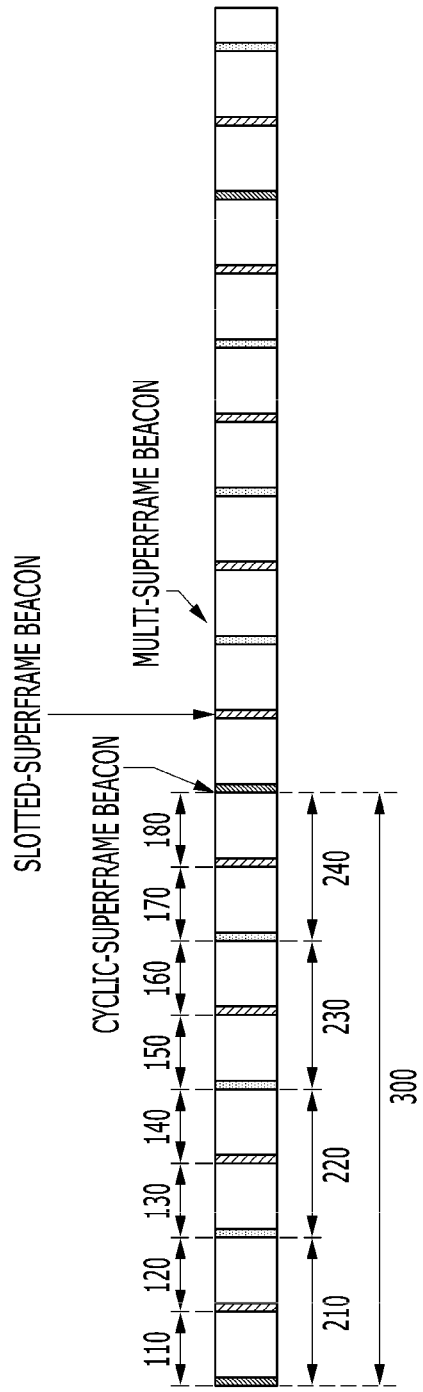
FIG. 2 is a diagram illustrating a structure of a cyclic-superframe that is used in an LECIM network according to an exemplary embodiment of the present invention.

FIG. 2 is a diagram illustrating a structure of a cyclic-superframe that is used in an LECIM network according to an exemplary embodiment of the present invention.

In order to provide a slot link that is synchronized with an entire node within the LECIM network, a plurality of slotted-superframes 110-180 exist, and a structure of a periodically repeated cyclic-superframe 300 is provided. The slotted-superframes 110-180 are formed in a group by the number of the integer times of 2 and form multi-superframes 210-240. In each of the slotted-superframes 110-180, a corresponding beacon frame performs a function of a cyclic-superframe beacon, a multi-superframe beacon, and a slotted-superframe beacon according to a position. The slotted-superframes 110-180 each correspond to a network coordinator and a beacon frame of each of a plurality of repeaters.

Figure 3:
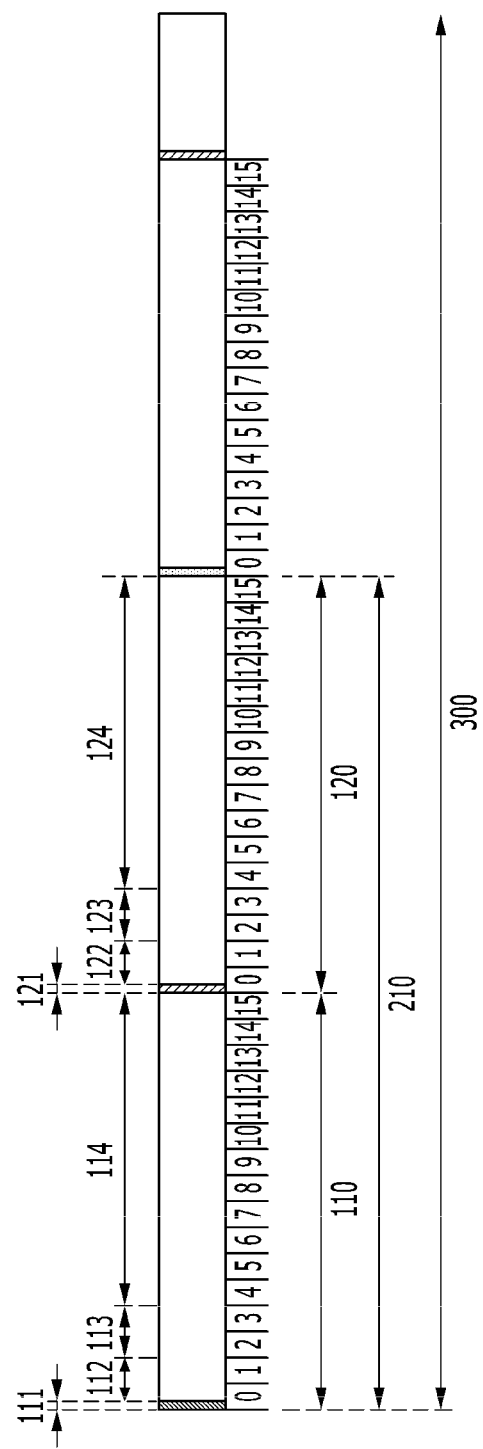
FIG. 3 is a diagram illustrating a structure of a time slot constituting a slotted-superframe that is shown in FIG. 2.

FIG. 3 is a diagram illustrating a structure of a time slot constituting a slotted-superframe that is shown in FIG. 2. For convenience of description, FIG. 3 illustrates a structure of a time slot of superframes 110 and 120 in detail.

The slotted-superframes 110 and 120 include beacon slots 111 and 121, prioritized device slots 112 and 122, coordinator slots 113 and 123, and bidirectional device slots 114 and 124, respectively.

The beacon slots 111 and 121 are each a time slot for transmitting/receiving a beacon frame. For example, when the superframe 110 is allocated to a network coordinator, and the superframe 120 is allocated to one repeater of a plurality of repeaters within a network, a beacon frame of the coordinator is transmitted/received at the beacon slot 111 of the superframe 110, and a beacon frame of the repeater is transmitted/received at the beacon slot 121 of the superframe 120.

The prioritized device slots 112 and 122 are each a time slot that is exclusively used for transmitting a data frame (hereinafter referred to as 'grade 0 data frame') to most preferentially transfer from a sensor device. Here, when transmitting a frame between the network coordinator and the sensor device, data transmission of three grades is provided. Transmission of grade 0 data is to transmit delay sensitive data, and a data frame that is transmitted in this time is referred to as a grade 0 data frame. Transmission of grade 1 data is for reliable transmission of data, and hereinafter, a data frame that is transmitted in this time is referred to as a 'grade 1 data frame'. Transmission of grade 2 data is for best effort data transmission, and hereinafter, a data frame that is transmitted in this time is referred to as a 'grade 2 data frame'.

The coordinator slots 113 and 123 are each a slot for transmitting a frame from a coordinator to a sensor device, and at the coordinator slots 113 and 123, broadcasting frames (e.g., a command frame, operation, administration, and maintenance (OAM)) of a coordinator are generally transmitted.

The bidirectional device slots 114 and 124 are each a slot that is allocated to an entire sensor device within an LECIM network. For example, when some time slots of the bidirectional device slot 114 are allocated to one sensor device of a plurality of sensor devices within a network, if a sensor device having received allocation of the time slot transmits a frame to a network coordinator, a time slot that is allocated thereto may be exclusively used, and when a sensor device having received allocation of the time slot receives a frame from the coordinator, the sensor device may exclusively use a time slot that is allocated thereto. The bidirectional device slots 114 and 124 include a primary bidirectional device slot and a supplementary bidirectional device slot. This will be described in detail with reference to FIG. 4.

Figure 4:
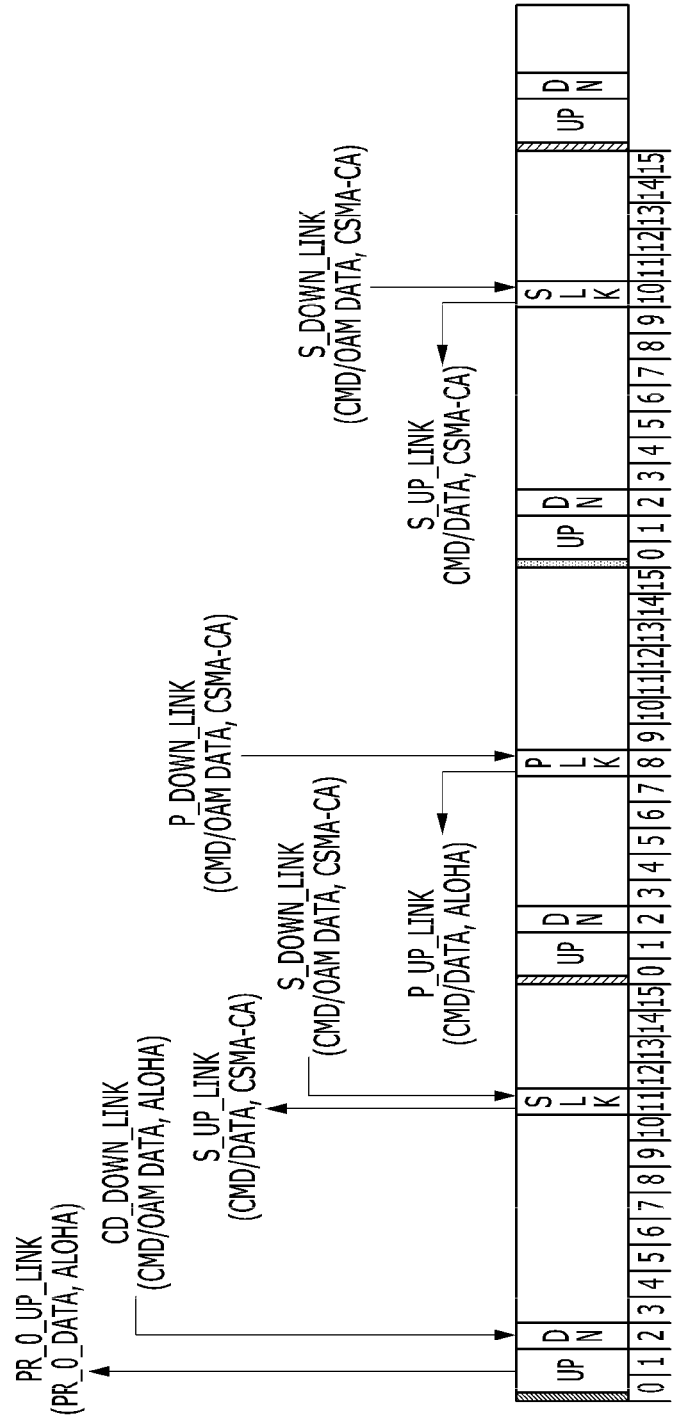
FIG. 4 is a diagram illustrating a link access method of a time slot of a slotted-superframe that is shown in FIG. 3.

FIG. 4 is a diagram illustrating a link access method of a time slot of a slotted-superframe that is shown in FIG. 3.

A prioritized device slot link (PR_0_UP_LINK) is a link that can be used in any device to transmit a grade 0 data frame, and as soon as the prioritized device slots 112 and 122 start, the PR_0_UP_LINK transmits a frame with an ALOHA method.

As soon as the coordinator slots 113 and 123 start, a coordinator slot link (CD_DOWN_LINK) is used as a link in which a coordinator transmits a frame (e.g., a command frame, an OAM frame) with an ALOHA method.

Bidirectional device slot links are classified into primary bidirectional device slot links P_UP_LINK and P_DOWN_LINK and a plurality of supplementary bidirectional device slot links S_UP_LINK and S_DOWN_LINK. The P_UP_LINK and P_DOWN_LINK are each a slot link for using when a sensor device having received allocation of a primary bidirectional device slot among sensor devices within an LECIM network exclusively transmits a frame to a coordinator (P_UP_LINK) or receives a frame from a coordinator (P_DOWN_LINK). The S_UP_LINK and S_DOWN_LINK are each a slot link that can be used when other devices are not used within an LECIM network. That is, the S_UP_LINK and S_DOWN_LINK are each a slot link in which use is additionally allowed at a remaining time band after preferential transmission of other sensor devices within a network. For example, it is assumed that two sensor devices exist within an LECIM network, and four bidirectional device slots exist within one cyclic-superframe, and a first bidirectional device slot as a primary bidirectional device slot of first to fourth bidirectional device slots and second and third bidirectional device slots as a supplementary bidirectional device slot are allocated to the first sensor device, and the second bidirectional device slot as a primary bidirectional device slot and the third and fourth bidirectional device slots as a supplementary bidirectional device slots are allocated to the second sensor device. In this example, when transmitting a frame to a coordinator (P_UP_LINK) or when receiving a frame from a coordinator (P_DOWN_LINK), the first sensor device may exclusively use the first bidirectional device slot, and only when a second sensor device is not used, may the second bidirectional device slot be used. Similarly, when transmitting a frame to a coordinator (P_UP_LINK) or when receiving a frame from a coordinator (P_DOWN_LINK), the second sensor device may exclusively use the second bidirectional device slot, and when other sensor devices are not used, the second sensor device may use the third and fourth bidirectional device slots. In the P_UP_LINK and P_DOWN_LINK, access methods of the up-link P_UP_LINK advancing toward a coordinator and the P_DOWN_LINK advancing toward a sensor device are different. As soon as a corresponding time slot starts, the P_UP_LINK transmits a frame with an ALOHA method. At the P_DOWN_LINK, the coordinator transmits a frame with a CSMA-CA method. Both the S_UP_LINK and the S_DOWN_LINK of the S_UP_LINK and S_DOWN_LINK use a CSMA-CA access method.

A slot link access method of advancing toward the coordinator from the sensor device divides and applies a use link and a link access procedure according to data transmission characteristics.

When a transmission time point of the sensor device is a prioritized device slot or a primary bidirectional device slot that is allocated to a corresponding sensor device, in grade 0 link access, a frame is immediately transmitted with an ALOHA method. When a transmission time point is a beacon slot, after awaiting until a prioritized device slot is to be started, a frame is transmitted with an ALOHA method. In other cases (i.e., when a transmission time point is a supplementary bidirectional device slot), a frame is immediately transmitted with a CSMA-CA method. When a first attempt is not succeeded, a grade 1 link access method is used.

In the grade 1 link access, after awaiting until a primary bidirectional device slot that is allocated to the sensor device is started, a frame is immediately transmitted with an ALOHA method. When an ACK frame is not received for a response standby time (macAckWaitDuration), a frame is transmitted with a CSMA-CA method at a nearest supplementary bidirectional device slot, and then the ACK frame is awaited. When a frame is not transmitted or when transmission of a frame has failed, transmission is attempted using a supplementary bidirectional device slot of a next order.

After awaiting until a primary directional device time slot that is allocated to a sensor device is started, in the grade 2 link access, a frame is immediately transmitted without a request for an ACK frame with an ALOHA method.

Figure 5:
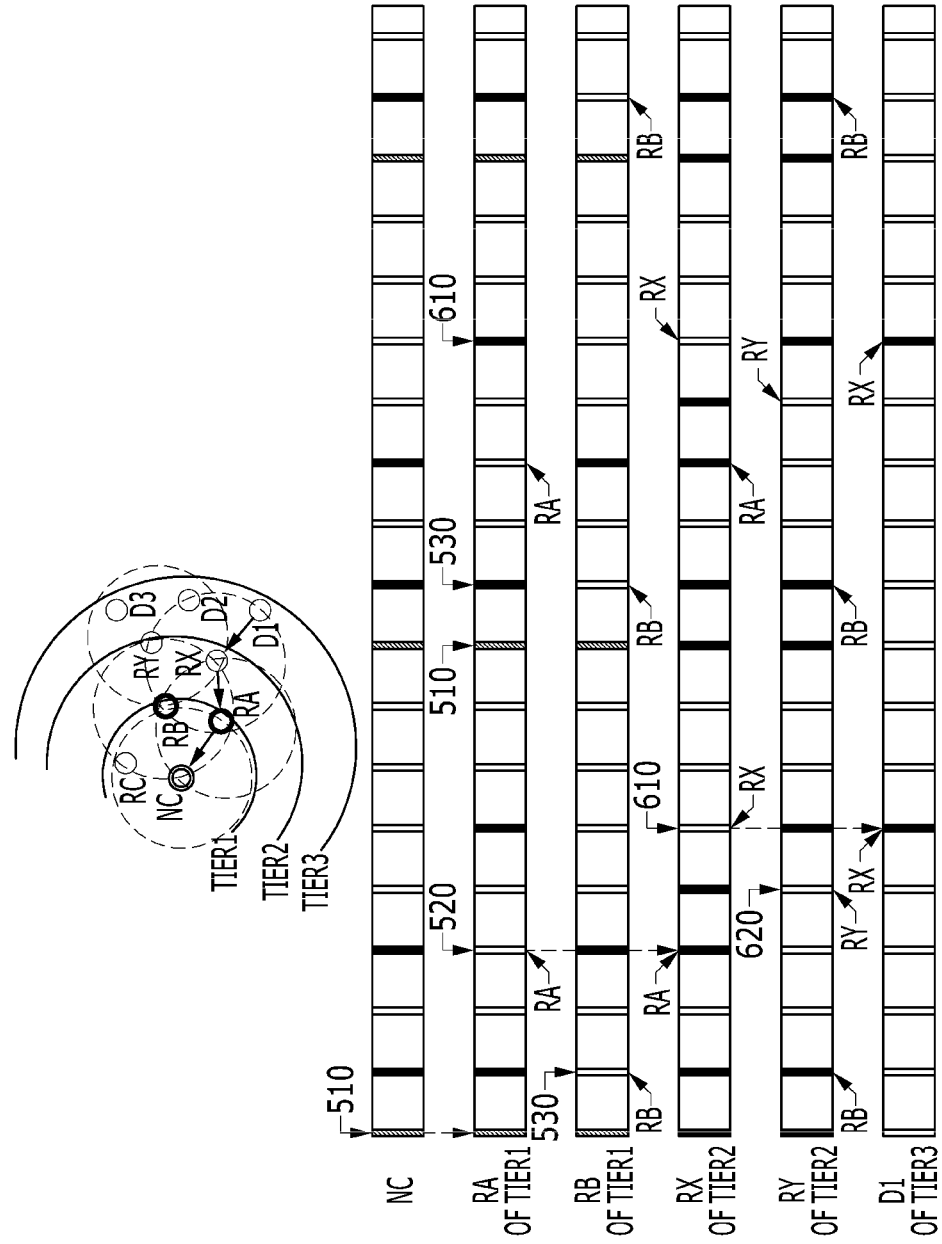
FIG. 5 is a diagram illustrating a method of extending a time-slot relaying based link of an LECIM network.

FIG. 5 is a diagram illustrating a time-slot relaying based link extension (TRLE) of an LECIM network. The TRLE has star-topology and is applied to a repeater of an LECIM network for providing a cyclic-superframe of a beacon-based time slot structure of FIG. 3. For convenience of description, FIG. 5 illustrates a case where a frame is transmitted by frame relay of two repeaters RA and RX between a network coordinator NC and the sensor device D1.

TRLE repeaters RA, RB, RX, and RY are positioned at a link between the network coordinator NC and sensor devices D1-D3, relay a frame that is generated in the sensor devices D1-D3 to the coordinator NC without a configuration change of the sensor devices D1-D3, or relay a frame that is generated in the coordinator NC to the sensor device D1-D3, thereby providing arrival range expansion of a link.

A first layer TIER1 is formed with repeaters RA, RB, and RC existing within a transmission arrival distance of the network coordinator NC, a second layer TIER2 is formed with the repeaters RX and RY that do not belong to the first layer TIER1 while existing within a transmission arrival distance of the repeaters RA, RB, and RC, and a third layer TIER3 is formed with sensor devices D1-D3 that do not belong to the second layer TIER2 while existing within a transmission arrival distance of the repeaters RX and RY. When relaying a frame, in order to distinguish a repeater of a layer that is higher than that of the repeaters RA, RB, RC, RX, and RY and a repeater of a layer that is lower than that of the repeaters RA, RB, RC, RX, and RY, the repeaters RA, RB, RC, RX, and RY use a repeater address and a layer identifier. Here, the first layer TIER1 is higher than the second and third layers TIER2 and TIER3, and the second layer TIER2 is higher than the third layer TIER3.

If the coordinator NC and the sensor devices D1-D3 have no TRLE function, a hop between the coordinator NC and a link is limited to one. That is, as only one repeater exists between the coordinator NC and the sensor devices D1-D3, frame relay between the coordinator NC and the sensor devices D1-D3 is limited to one hop relay. In this case, the TRLE repeater determines a time slot to relay a beacon frame of the coordinator NC.

If the coordinator NC has a TRLE function, the repeaters RA, RB, RC, RX, and RY request an access registration (repeater registration) to the TRLE coordinator NC, thereby receiving designation of a time slot to relay a cyclic-superframe beacon frame from the TRLE coordinator NC. When the TRLE repeaters RA, RB, RC, RX, and RY request an acceptance registration to the TRLE coordinator NC, the repeaters RA, RB, RC, RX, and RY search for a beacon frame of a peripheral repeater thereof and provide information about a beacon frame, having been received from a layer that is higher than that thereof, a beacon frame, having been received from the same layer as that thereof, and a beacon frame, having been received from a layer that is lower than that thereof to the coordinator NC.

After the repeaters RA, RB, RC, RX, and RY connect to the coordinator, before the repeaters RA, RB, RC, RX, and RY relay a beacon frame having been received from a layer that is higher than that thereof to a layer that is lower than that of thereof, the repeaters RA, RB, RC, RX, and RY adjust a bit map that displays a position of a beacon frame of a peripheral repeater to correspond to a present layer thereof, delete information about a beacon frame of a repeater that is separated by 2-hop or more therefrom, and adjust and transfer a bit map representing position information of a beacon frame using the remaining acquired information. Specifically, when a beacon slot of a specific superframe of superframes within a cyclic-superframe is allocated for a beacon frame of a peripheral repeater, a bit corresponding to the specific superframe among bits of a bit map is set to 1, and other bits are set to 0.

A cyclic-superframe beacon slot of each of the repeaters RA, RB, RC, RX, and RY is allocated to a time slot that is separated by predetermined integer times of a superframe length based on a cyclic-superframe beacon frame (or a beacon slot) of the network coordinator NC. For example, a beacon slot 520 of the repeater RA is allocated to a beacon slot that is separated by triple a superframe length from a beacon slot 510 of the network coordinator NC, a beacon slot 530 of the repeater RB is allocated to a beacon slot that is separated by 1 times a superframe length from the beacon slot 510 of the network coordinator NC, a beacon slot 610 of the repeater RX is allocated to a beacon slot that is separated by quintuple a superframe length from the beacon slot 510 of the network coordinator NC, and a beacon slot 620 of the repeater RY is allocated to a beacon slot that is separated by quadruple a superframe length from the beacon slot 510 of the network coordinator NC. A position of a cyclic-superframe beacon frame of the repeaters RA, RB, RC, RX, and RY is displayed based on a position of a cyclic-superframe beacon frame of the network coordinator NC. For example, a position of a cyclic-superframe beacon frame (beacon frame that is transmitted and received at the beacon slot 520) of the repeater RA is displayed as a position that is separated by the triple a superframe length from a position of a cyclic-superframe beacon frame (beacon frame that is transmitted and received at the beacon slot 510) of the network coordinator NC.

A cyclic-superframe of the network coordinator NC is from a start point of the beacon slot 510 to before a start point of a next beacon slot 510, a cyclic-superframe of the repeater RA is from a start point of the beacon slot 520 to before a start point of a next beacon slot 520, a cyclic-superframe of the repeater RB is from a start point of the beacon slot 530 to before a start point of a next beacon slot 530, a cyclic-superframe of the repeater RX is from a start point of the beacon slot 610 to before a start point of a next beacon slot 610, and a cyclic-superframe of the repeater RY is from a start point of the beacon slot 620 to before a start point of a next beacon slot 620.

A repeater, having received a frame from a repeater of a layer that is higher than that thereof at a specific time slot relays the frame at a time slot that is delayed from the specific time slot by a gap between a cyclic-superframe beacon frame of a repeater of a layer that is higher than that thereof and a cyclic-superframe beacon frame thereof. For example, when the repeater RA receives a frame at a specific time slot of bidirectional device slots from the coordinator NC, the repeater RA relays the frame to the repeater RX at a time slot that is delayed from the specific time slot by the triple a superframe length, which is a gap between a cyclic-superframe beacon frame thereof and a cyclic-superframe beacon frame of the coordinator NC. The repeater RX, having received the frame from the repeater RA, relays the frame to the sensor device D1 at a time slot that is delayed from a time slot, having received the frame by the double a superframe length, which is a gap between a cyclic-superframe beacon frame thereof and a cyclic-superframe beacon frame of the repeater RA.

Figure 6B:
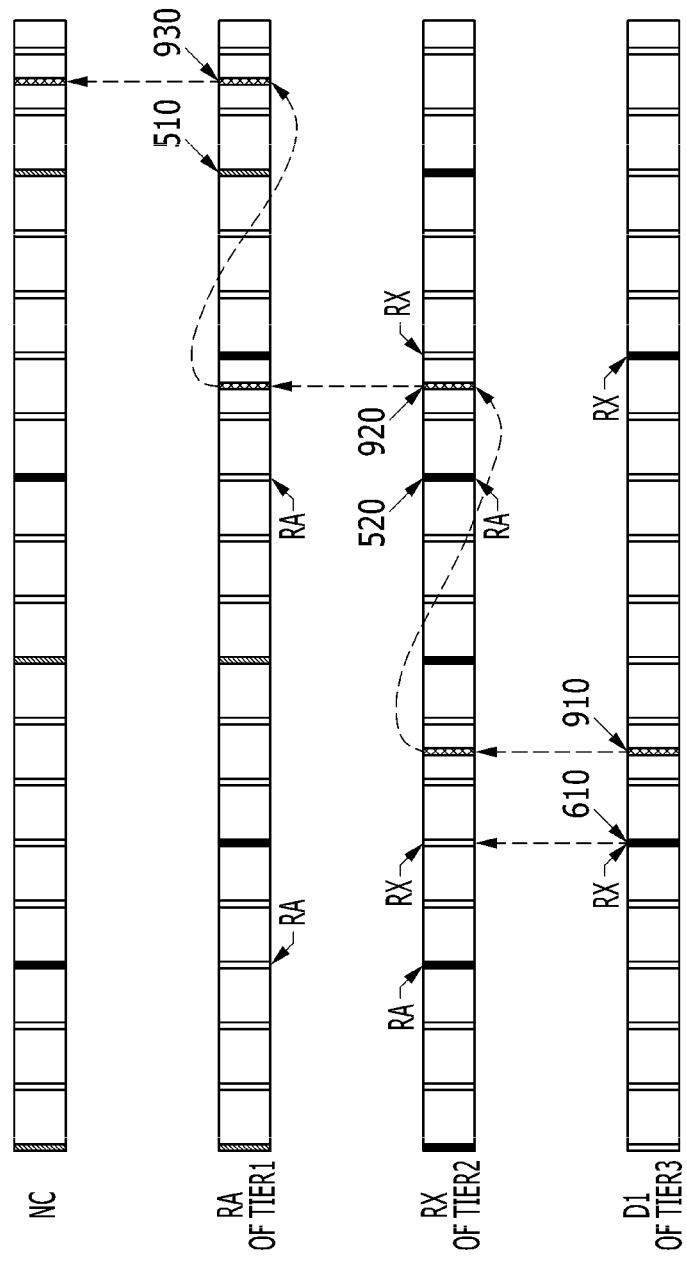
FIG. 6B is a diagram illustrating a process of transmitting a frame from a sensor device to a network coordinator by frame relay in an LECIM network.

FIGS. 6A and 6B are diagrams illustrating a method of relaying a frame that is synchronized with a time slot at an LECIM network. Specifically, FIG. 6A is a diagram illustrating a process of transmitting a frame from the network coordinator NC to the sensor device D1 by frame relay of a repeater in an LECIM network, and FIG. 6B is a diagram illustrating a process of transmitting a frame from the sensor device D1 to the network coordinator NC by frame relay of a repeater in an LECIM network.

The repeaters RA and RX relay a frame that is received from a repeater of a layer that is higher than that thereof or a layer that is lower than that thereof as well as a frame generating at a layer thereof to a slot link of an advancing direction by a predetermined rule according to time slot information.

As shown in FIG. 5 or 6, a repeater, having received a beacon frame from a coordinator or a repeater of a layer that is higher than that thereof, transmits a beacon frame from a reception time point at a beacon slot of a superframe existing at a position that is delayed by synchronous superframe delay that is determined by a network TRLE coordinator NC or a TRLE repeater. For example, when the repeater RA receives a beacon frame of the coordinator NC from the coordinator NC at the beacon slot 510, the repeater RA transmits a beacon frame at the beacon slot 520 of a superframe existing at a position that is delayed by the triple a superframe length, which is a predetermined synchronization delay value from the beacon slot 510. When the repeater RX receives a beacon frame from the repeater RA at the beacon slot 520, the repeater RX transmits a beacon frame at the beacon slot 610 of a superframe existing at a position that is delayed by the double a superframe length, which is a predetermined synchronization delay value thereof, from the beacon slot 520.

If the frame can be transmitted within a corresponding time slot, a repeater, having received a frame at a prioritized device slot, immediately relays the frame, and if the frame cannot be transmitted within a corresponding time slot, when a prioritized device slot of a next superframe or when a primary bidirectional device slot that is previously allocated to a sensor device is available, the repeater relays the frame at a corresponding time slot.

If the frame can be transmitted within a corresponding time slot, a repeater, having received a frame at a coordinator slot, immediately relays the frame, and if the frame cannot be transmitted within a corresponding time slot, the repeater relays the frame at a coordinator slot of a next superframe.

A repeater, having received a frame from a coordinator NC or a repeater of a layer that is higher than that thereof at a bidirectional device slot, relays the frame to a next layer that is lower than that thereof at a time slot of a position that is delayed from a reception time point by a gap between a beacon frame of a coordinator NC or a repeater of a layer that is higher than that thereof and a beacon frame thereof. For example, when the repeater RA receives a frame at a bidirectional device slot 810 from the network coordinator NC, the repeater RA relays the frame to the repeater RX at a time slot 820 of a position that is delayed from a reception time point 810 of the frame by the triple a superframe length, which is a gap between a beacon frame of the network coordinator NC and a beacon frame thereof (i.e., a gap between the beacon slot 510 and the beacon slot 520). The repeater RX, having received a frame from the repeater RA at the bidirectional device slot 820, relays the frame to the sensor device D1 at a time slot 830 of a position that is delayed from a reception time point 820 of the frame by the double a superframe length, which is a gap between a beacon frame of the repeater RA and a beacon frame thereof (i.e., a gap between the beacon slot 520 and the beacon slot 610) of the frame.

A repeater, having received a frame from a repeater or a sensor device of a layer that is lower than that thereof at the bidirectional device slot, relays the frame to a layer that is higher than that thereof at a time slot of a position that is delayed from a beacon frame of a coordinator or a repeater of a next layer that is higher than that thereof by a gap between a position of the received time slot and a beacon frame thereof. For example, when the repeater RX receives a frame from the sensor device D1 at the bidirectional device slot 910, the repeater RX relays the frame to the repeater RA at a time slot 920 of a position of a beacon frame of the repeater RA (i.e., a position that is delayed from the beacon slot 520) by a gap between a position of a beacon frame thereof and a reception time slot 910 (i.e., a gap between the beacon slot 610 and the bidirectional device slot 910). The repeater RA, having received a frame from the repeater RX at the bidirectional device slot 920, relays the frame to the coordinator NC at a time slot 930 of a position that is delayed from a position of a beacon frame of the coordinator NC (i.e., the beacon slot 510) by a gap between a position of a beacon frame thereof and the reception time slot 920 (i.e., a gap between the beacon slot 520 and the bidirectional device slot 920).

According to the present invention, in order to form a low power wireless network in a wide area, by using a beacon-based time slot link structure, an access method on a slot link basis, and a frame relay method by a repeater, while maintaining star-topology, power consumption of a device is minimized, and a transmittable area of the network can be extended.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A sensor network, comprising:
a network coordinator that broadcasts a first beacon frame;
a sensor device that receives a frame from the network coordinator or transmits a frame to the network coordinator; and
at least one repeater that relays the frame from the network coordinator to the sensor device or relays the frame of the sensor device to the network coordinator and that broadcasts a second beacon frame that is synchronized with the first beacon frame, the at least one repeater being configured to search for beacon frames of peripheral repeaters thereof and provide information about the searched beacon frames to the network coordinator when the at least one repeater requests an access registration to the network coordinator to receive from the network coordinator a designation of a time slot to relay a beacon frame,
wherein the sensor device is synchronized with the second beacon frame to transmit/receive the frame, the network coordinator, the sensor device, and the repeater operate in a periodically repeated cyclic-superframe structure, the cyclic-superframe comprises a plurality of slotted-superframes corresponding to the first beacon frame and the second beacon frame,
a first repeater of the at least one repeater relays a first frame at a time slot that is delayed by a first gap between a first superframe including a beacond slot for the first beacon frame and a second superframe including a beacon slot for the second beacon frame of the first repeater from a first time slot when the first repeater receives the first frame at the first time slot of bidirectional device slots included in the cyclic-superframe from the network coordinator, and
the first gap can be changed according to the information about the searched beacon frames.

2. The sensor network of claim 1, wherein each of superframes that are included in the cyclic-superframe comprises:
a beacon slot that is used for transmitting a beacon frame corresponding thereto among the first and second beacon frames;
a prioritized device slot that starts at a time point at which the beacon slot is terminated and that is used when the sensor device transmits a grade 0 data frame that is sensitive to time delay;
a coordinator slot that is used when the network coordinator broadcasts a command frame or an operation, administration, and maintenance (OAM) frame; and
the bidirectional device slot that is used when the sensor device receives a frame that is transmitted from the network coordinator or when the sensor device transmits a frame to the network coordinator.

3. The sensor network of claim 2, wherein the sensor device receives an allocation of a primary bidirectional device slot that is exclusively used for transmitting a frame to the network coordinator or for receiving a frame from the network coordinator, and a supplementary bidirectional device slot that can be used when other sensor devices within the sensor network are not used.

4. The sensor network of claim 3, wherein the cyclic-superframe of the network coordinator is from the first superframe to a superframe immediately before a next first superframe, and a cyclic-superframe of the first repeater is from the second superframe to a superframe immediately before a next second superframe.

5. The sensor network of claim 4,
wherein the network coordinator broadcasts the first beacon frame at a beacon slot within the first superframe, the first repeater broadcasts the second beacon frame of the first repeater at a beacon slot within the second superframe that is separated by a first predetermined integer times of a superframe length from the first superframe, and
a second repeater of the at least one repeater broadcasts the second beacon frame of the second repeater at a beacon slot within a third superframe that is separated by a second predetermined integer times of a superframe length from the first superframe.

6. The sensor network of claim 5, wherein the first repeater relays a frame between the network coordinator and the second repeater, the second repeater relays a frame between the first repeater and the sensor device, and a cyclic-superframe of the second repeater is from the third superframe to a superframe immediately before a next third superframe.

7. The sensor network of claim 6, wherein a data frame in which the sensor device transmits is one of the grade 0 data frame, a grade 1 data frame requiring reliable transmission of data, and a grade 2 data frame requiring best effort data transmission, and when the data frame is the grade 0 data frame, if a transmission time point is a prioritized device slot or a primary bidirectional device slot that is allocated to the sensor device, the sensor device transmits the data frame with an ALOHA method, if a transmission time point is a beacon slot, the sensor device awaits until the prioritized device slot and transmits with the ALOHA method, and if a transmission time point is a supplementary bidirectional device slot that is allocated to the sensor device, the sensor device transmits the data frame with a CSMA-CA method.

8. The sensor network of claim 7, wherein when the data frame is the grade 1 data frame, if a transmission time point is a primary bidirectional device slot that is allocated to the sensor device, the sensor device transmits the data frame with the ALOHA method, and when the sensor device does not receive a response frame for a response standby time, the sensor device transmits the data frame with the CSMA-CA method at a nearest time slot of supplementary bidirectional device slots that are allocated thereto and awaits the response frame, and if transmission is a failure, the sensor device transmits the data frame at a supplementary bidirectional device slot of a next order, and when the data frame is the grade 2 data frame, the sensor device awaits until a primary bidirectional device slot that is allocated thereto is started and transmits the data frame with the ALOHA method without a response frame request.

9. The sensor network of claim 3, wherein at the prioritized device slot, the grade 0 data frame is transmitted to an up-link advancing toward the network coordinator by an ALOHA method, at the coordinator slot, a command frame or an OAM frame of the network coordinator is transmitted to a down-link advancing toward the sensor device by the ALOHA method, at a primary bidirectional device slot that is allocated to the sensor device, a frame is transmitted to the up-link by the ALOHA method, and a frame is transmitted to the down-link by a CSMA-CA method, and at a supplementary bidirectional device slot that is allocated to the sensor device, a frame is transmitted to the up-link or the down-link by the CSMA-CA method.

10. The sensor network of claim 6,
wherein when the first repeater receives the first frame at the first time slot of bidirectional device slots within a cyclic-superframe of the network coordinator from the network coordinator, the first repeater relays the first frame to the second repeater at a time slot that is delayed by a gap between the first superframe and the second superframe from the first time slot, and
when the second repeater receives the first frame at a second time slot of bidirectional device slots within a cyclic-superframe of the first repeater from the first repeater, the second repeater relays the first frame to the sensor device at a time slot that is delayed by a gap between the second superframe and the third superframe from the second time slot.

11. The sensor network of claim 1, when the first repeater receives a second frame at a second time slot of bidirectional device slots included in the cyclic-superframe, the first repeater relays the second frame to the network coordinator at a time slot that is delayed from a start point of the first superframe by a gap between a start point of the second time slot and a start point of the second superframe.

12. The sensor network of claim 6, wherein when the second repeater receives a second frame at a second time slot of bidirectional device slots within a cyclic-superframe of the second repeater from the sensor device, the second repeater relays the second frame to the first repeater at a time slot that is delayed from a start point of the second superframe by a gap between a start point of the second time slot and a start point of the third superframe, and when the first and second repeaters each receive a frame at the prioritized device slot, if the frame can be transmitted within the received prioritized device slot, the first and second repeaters each immediately relay the frame, and if the frame cannot be transmitted within the received prioritized device slot, the first and second repeaters each relay the frame at a prioritized device slot of a next superframe or at a previous primary bidirectional device slot.

13. The sensor network of claim 6, wherein when the first and second repeaters each receive a frame at the coordinator slot, if the frame can be transmitted within the received coordinator slot, the first and second repeaters each immediately relay the frame, and if the frame cannot be transmitted within the received coordinator slot, the first and second repeaters each relay the frame at a coordinator slot of a next superframe.

14. A method of link extension based on time-slot relaying in a sensor network comprising a network coordinator, a sensor device, and a repeater belonging to each layer that is formed according to a distance from the network coordinator, the method comprising:
relaying, by a first repeater included in the sensor network, a first frame to a first device of a layer that is lower than that thereof at a time slot corresponding to a first time slot of time slots within a cyclic-superframe thereof when the first repeater receives the first frame at the first time slot of time slots within a cyclic-superframe of a second device from the second device of a layer that is higher than that thereof; and
relaying, by the first repeater, at a time slot corresponding to a second time slot of time slots within a cyclic-superframe of the second device when the first repeater receives the second frame at the second time slot of time slots within a cyclic-superframe thereof from the first device,
wherein the second device is the network coordinator or a repeater of a layer that is higher than that of the first repeater, the first device is the sensor device or a repeater of a layer that is lower than that of the first repeater, and the relaying of the second frame to the second device comprises relaying, by the first repeater, the second frame to the second device at a time slot that is delayed from a start point of a beacon frame of the second device by a first gap between a start point of the second time slot and a start point of a beacon frame of the first repeater when the second time slot is a bidirectional device slot,
wherein the first repeater is configured to search for beacon frames of peripheral repeaters and provide information about the searched beacon frames to the network coordinator when the first repeater requests an access registration to the network coordinator to receive from the network coordinator a designation of a time slot to relay a beacon frame, and
wherein the first gap can be changed according to the information about the searched beacon frames.

15. The method of claim 14,
wherein the cyclic-superframe comprises a time slot-based first superframe corresponding to a first beacon frame that is broadcasted at the network coordinator and a time slot-based second superframe corresponding to a second beacon frame that is broadcasted at a repeater belonging to the each layer, and the first and second superframes are periodically repeated, and
the sensor network operates in the cyclic-superframe structure.

16. The method of claim 15, wherein the second superframe corresponding to the first repeater starts at a position apart by predetermined integer times for the first repeater of a superframe length from a start point of the first superframe.

17. The method of claim 15, wherein a repeater belonging to each layer uses a repeater address and a layer identifier.

18. The method of claim 15, wherein each of superframes that are included in the cyclic-superframe comprise:
a beacon slot that is used for transmitting a beacon frame corresponding thereto among the first and second beacon frames;
a prioritized device slot that starts at a time point at which the beacon slot is terminated and that is used when the sensor device transmits a grade 0 data frame that is sensitive to time delay;
a coordinator slot that is used when the network coordinator broadcasts a command frame or an operation, administration, and maintenance (OAM) frame; and
the bidirectional device slot that is used when the sensor device receives a frame that is transmitted from the network coordinator or when the sensor device transmits a frame to the network coordinator, and the sensor device receives allocation of a primary bidirectional device slot that is exclusively used for transmitting a frame to the network coordinator or for receiving a frame from the network coordinator, and a supplementary bidirectional device slot that can be used when other sensor devices within the sensor network are not used.

19. The method of claim 14, wherein the relaying of the first frame to relaying, by the first repeater, the first frame to the first device at a time slot that is delayed from the first time slot by a gap between a beacon frame of the first repeater and a beacon frame of the second device when the first time slot is a bidirectional device slot.

* * * * *